(12) United States Patent
Kodama et al.

(10) Patent No.: US 10,067,010 B2
(45) Date of Patent: Sep. 4, 2018

(54) STRAIN DETECTOR AND MANUFACTURING METHOD THEREOF

(71) Applicant: NAGANO KEIKI CO., LTD., Tokyo (JP)

(72) Inventors: Hiroshi Kodama, Tokyo (JP); Eiji Takeda, Tokyo (JP); Takamitsu Yoshizawa, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 13 days.

(21) Appl. No.: 15/614,708

(22) Filed: Jun. 6, 2017

(65) Prior Publication Data

US 2017/0356814 A1 Dec. 14, 2017

(30) Foreign Application Priority Data

Jun. 9, 2016 (JP) .................. 2016-115168

(51) Int. Cl.
*G01L 1/22* (2006.01)
(52) U.S. Cl.
CPC .................. *G01L 1/2287* (2013.01)
(58) Field of Classification Search
CPC . G01L 1/2287; G01L 1/20; G01L 1/22; G01L 1/26; H01C 17/00; H01C 10/12; H01C 101/10
USPC ........................................... 338/2
See application file for complete search history.

(56) References Cited

U.S. PATENT DOCUMENTS

| | | | | |
|---|---|---|---|---|
| 3,858,150 A | * | 12/1974 | Gurtler et al. ........ | G01L 9/0042 257/E29.324 |
| 8,726,738 B2 | * | 5/2014 | Grange .................... | G01B 7/18 73/841 |
| 2005/0193836 A1 | * | 9/2005 | Yoshida ................ | G01L 9/0051 73/862.628 |
| 2006/0099821 A1 | * | 5/2006 | Nagasaka ............. | G01L 9/0042 438/758 |
| 2015/0107913 A1 | * | 4/2015 | Trakhimovich ..... | G01G 3/1412 177/211 |

FOREIGN PATENT DOCUMENTS

| | | |
|---|---|---|
| EP | 1 318 390 A2 | 6/2003 |
| EP | 1 571 434 A2 | 9/2005 |
| EP | 1 589 329 A1 | 10/2005 |
| JP | 3099584 | 8/2000 |

OTHER PUBLICATIONS

European Search Report dated Oct. 17, 2017, 8 pages.

* cited by examiner

*Primary Examiner* — Kyung Lee
(74) *Attorney, Agent, or Firm* — Rankin, Hill & Clark LLP

(57) ABSTRACT

A strain detector includes a strain-causing portion, an insulation film formed on the strain-causing portion, a strain gauge formed on the insulation film and configured to detect the strain generated by the strain-causing portion as electric signals, an electrode connected to the strain gauge, a bonding pad extending from the electrode, a bonding wire connected to the bonding pad, and an insulative resin layer covering the strain gauge without covering the bonding pad and the bonding wire.

7 Claims, 5 Drawing Sheets

STRAIN DETECTOR AND MANUFACTURING METHOD THEREOF

The entire disclosure of Japanese Patent Application No. 2016-115168 filed Jun. 9, 2016 is expressly incorporated by reference herein.

TECHNICAL FIELD

The present invention relates to a strain detector and a manufacturing method of the strain detector.

BACKGROUND ART

Some of known strain detectors include a strain gauge configured to detect strain caused on a strain-causing portion as electric signals, and an electrode pad connected to the strain gauge through an electrode wiring.

A semiconductor pressure sensor as a typical example of the strain detector includes: a printed board also serving as a stem; a pressure-sensitive diaphragm chip mounted on the printed board, the pressure-sensitive diaphragm chip including a silicon wafer diaphragm and strain gauge resistors provided on the diaphragm in a dispersed manner; and a wire connecting a surface electrode on the chip and the printed board (Patent Literature 1; JP 3099584 B).

In the typical example disclosed in Patent Literature 1, silicone gel is coated on the surface of the chip in order to protect the pressure-sensitive diaphragm chip from being corroded due to moisture and the like.

When the thickness of the silicone gel is thick at the center of the pressure-sensitive diaphragm chip and is thin at a periphery of the pressure-sensitive diaphragm chip in the typical semiconductor pressure sensor, a stress caused due to temperature change is not evenly applied on the chip, which adversely affects pressure detection sensitivity.

Accordingly, the silicone gel is filled in a case in which the pressure-sensitive diaphragm chip and a wire are housed, and subsequently the silicone gel is sucked out of the case so that the silicone gel is applied evenly all over the surfaces of the pressure-sensitive diaphragm chip and the wire.

In the typical example disclosed in Patent Literature 1, since the silicone gel is filled in the case in which the pressure-sensitive diaphragm chip and the wire are housed, much amount of the silicone gel have to be used. In addition, since a device for filling the case with the silicone gel is required, a size of equipment becomes large. In addition, since the silicone gel is filled after a surface electrode on the chip and the printed board are connected via the wire, the presence of the wire may sometimes hinders the filling process of the silicone gel, thereby complicating the manufacturing process of the sensor.

SUMMARY OF THE INVENTION

An object of the invention is to provide a strain detector capable of favorably maintaining strain detection accuracy and simplifying the manufacturing process, and a manufacturing method of the strain detector.

A strain detector according to an aspect of the invention includes: a strain-causing portion configured to cause an external stress; an insulation film formed on at least a part of the strain-causing portion; a strain gauge formed on the insulation film, the strain gauge being configured to detect the strain caused by the strain-causing portion as an electric signal; an electrode connected with the strain gauge; a bonding pad extended from the electrode and configured to export the electric signal to an outside; a bonding wire connected to the bonding pad; and an insulative resin layer at least covering the strain gauge without covering the bonding pad and the bonding wire.

Surface charges change when an ionic contamination and the like are adhered on and/or around the strain gauge, causing an adverse influence in detecting strains. Accordingly, the strain gauge is covered with the insulative resin layer in the above aspect of the invention, so that the influence of the surface charge exerted on the strain gauge can be reduced and the strain measurement accuracy can be kept at a favorable level.

Further, the insulative resin layer does not cover the bonding pad and the bonding wire, but the bonding pad and the bonding wire are exposed. Since the bonding pad and the bonding wire are not connected during the formation of the insulative resin layer, the bonding wire does not inhibit the formation of the insulative resin layer and the manufacturing process of the strain detector can be simplified.

It should be noted that the term "cover the strain gauge with the insulative resin layer" not only refers to directly forming the insulative resin layer on the strain gauge but also refers to providing an intermediate layer on the strain gauge and forming the insulative resin layer on the intermediate layer.

In the strain detector of the above aspect of the invention, it is preferable that a thickness of the insulative resin layer ranges from 2 μm to 500 μm.

According to the above arrangement, since the thickness of the insulative resin layer is set within the appropriate range, the influence of the surface charge can be reduced and excellent strain detection accuracy can be obtained. Specifically, when the thickness of the insulative resin layer is less than 2 μm, the thickness of the insulative resin layer is too thin to reduce the influence of the surface charge. When the thickness of the insulative resin layer exceeds 500 μm, the thickness of the insulative resin layer is so thick that the displacement of the strain gauge is inhibited, thereby deteriorating the strain detection accuracy.

In the strain detector according to the above aspect of the invention, it is preferable that the insulative resin layer is formed from a silicone resin and has a Shore A hardness ranging from 10 to 100.

According to the above arrangement, since the hardness of the insulative resin layer is set within the appropriate range, excellent strain detection accuracy can be obtained.

Specifically, when the Shore A hardness of the insulative resin layer is less than 10, the insulative resin layer is too soft to maintain the shape of the insulative resin layer. When the Shore A hardness of the insulative resin layer exceeds 100, the insulative resin layer is so hard that the displacement of the strain gauge is inhibited, thereby deteriorating the strain detection accuracy.

In the strain detector according to the above aspect of the invention, the strain gauge may include four resistors, the insulative resin layer collectively covering the four resistors.

According to the above arrangement, since the four resistors are covered with the single linear insulative resin layer, the formation process of the insulative resin layer can be facilitated.

In the strain detector according to the above aspect of the invention, the strain gauge may include four resistors, the insulative resin layer separately covering each of the four resistors.

According to the above arrangement, since the insulative resin layer is formed only on the necessary portion, the amount of the used insulative resin and, consequently, the production cost can be reduced.

A method according to another aspect of the invention is for producing a strain detector including: a strain-causing portion configured to cause a strain in response to an external stress; an insulation film formed on at least a part of the strain-causing portion; a strain gauge formed on the insulation film, the strain gauge being configured to detect the strain caused by the strain-causing portion as an electric signal; an electrode connected to the strain gauge; a bonding pad extended from the electrode and configured to export the electric signal to an outside; and a bonding wire connected to the bonding pad, the method including: prior to connecting the bonding wire to the bonding pad, covering at least the strain gauge using an insulative resin layer without covering the bonding pad.

According to the above aspect of the invention, in order to assemble the strain detector, the insulation film is initially formed on the strain-causing portion, and the strain gauge, the electrode and the bonding pad are formed on the insulation film. Then, while the bonding pad is uncovered and exposed, the insulative resin layer is formed at least on the strain gauge directly or indirectly through the intermediate layer. In this state, the strain gauge is covered with the insulative resin layer, so that the influence of the surface charge exerted on the strain gauge can be reduced. Accordingly, since the vicinity of the strain gauge is less likely to be influenced by the surface charge before the bonding wire is connected to the bonding pad, the management of the strain detector can be facilitated.

Then, the bonding pad and the bonding wire are connected. Since the bonding pad is not covered with the insulative resin layer but is exposed, the insulative resin layer does not inhibit the connection process of the bonding wire.

BRIEF DESCRIPTION OF DRAWING(S)

DESCRIPTION OF EMBODIMENT(S)

Figure 1A:
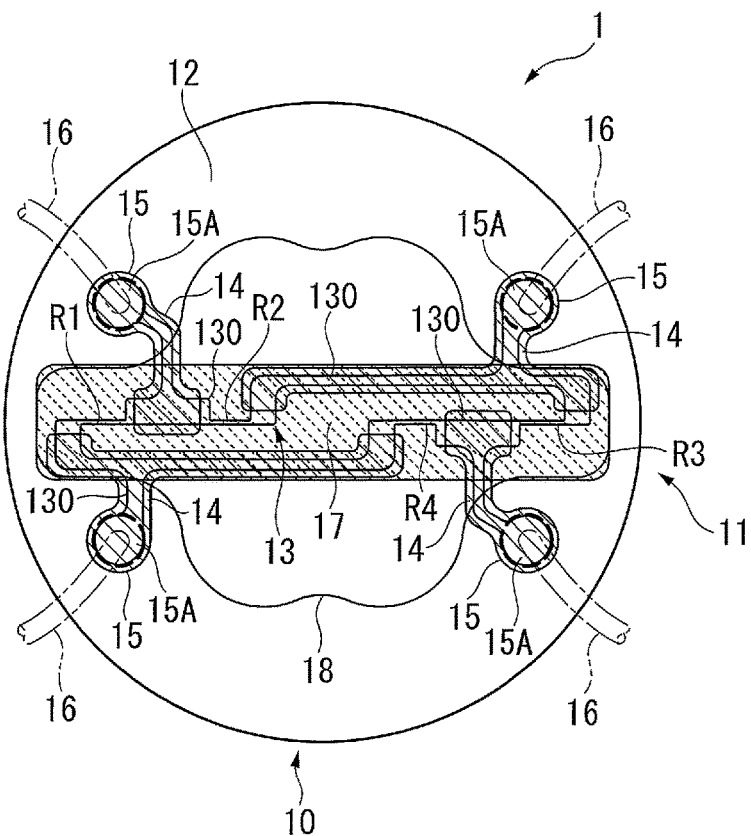
FIG. 1A is a plan view showing a strain detector according to a first exemplary embodiment of the invention.

Exemplary embodiment(s) of the invention will be described below with reference to the attached drawings. It should be noted that, in the description of each of the exemplary embodiments, the same components in each of the exemplary embodiments will be designated by the same reference numerals to omit the description thereof.

First Exemplary Embodiment

Figure 1B:
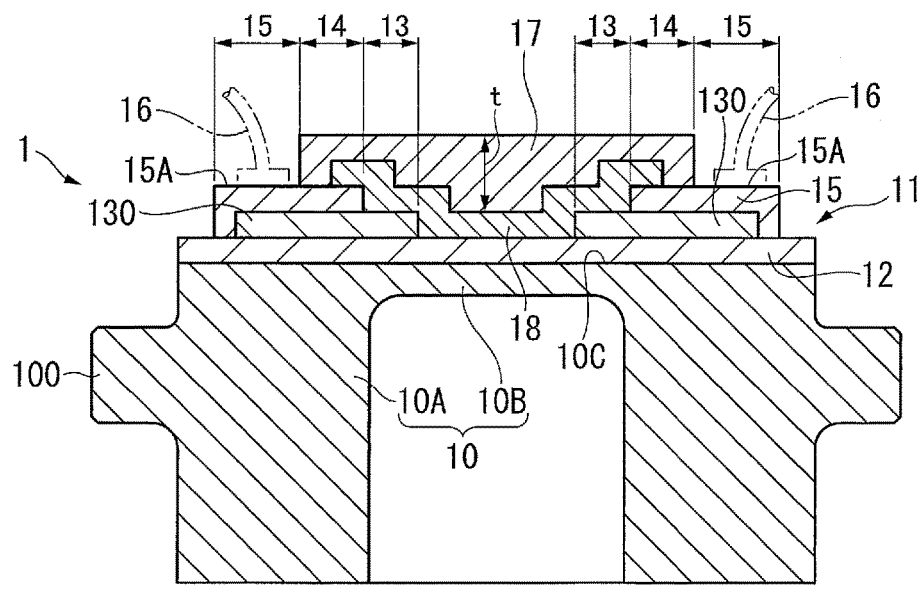
FIG. 1B is a cross section schematically showing the strain detector according to the first exemplary embodiment of the invention.

FIG. 1A and FIG. 1B show a strain detector according to a first exemplary embodiment. FIG. 1A is a plan view showing the strain detector, and FIG. 1B is a cross section schematically showing the strain detector.

Arrangement of Strain Detector

As shown in FIGS. 1A and 1B, the strain detector 1 includes a pressure-sensitive element 10 and a detector 11 formed on the pressure-sensitive element 10. The detector 11 includes: an insulation film 12 provided on the pressure-sensitive element 10; a strain gauge 13 formed on the insulation film 12; electrodes 14 connected to the strain gauge 13; four bonding pads 15 each extending from each of the electrodes 14; bonding wires 16 each connected to each of the bonding pads 15; a protection film 18 disposed over the insulation film 12, the strain gauge 13 and the electrodes 14; and an insulative resin layer 17 partially covering the protection film 18 and the electrodes 14. It should be noted that FIG. 1B schematically shows the strain detector, where, in order to clarify a layer structure of the detector 11, the thicknesses of the insulation film 12, the strain gauge 13, the electrodes 14, the bonding pads 15 and the protection film 18 are exaggerated.

The pressure-sensitive element 10 includes a cylindrical portion 10A having a flange 100, and a strain-causing portion 10B (diaphragm) and is made from a metal material.

An end face of the cylindrical portion 10A is flush with an end face of the strain-causing portion 10B to define a mirror-finished film-formation surface 10C.

The insulation film 12 is formed on the entire surface of the film-formation surface 10C by vapor deposition, coating, printing or the like. The insulation film 12 is formed of, for instance, silicon oxide film.

The strain gauge 13 defines a bridge circuit including four resistors R1, R2, R3, R4.

The resistor R1 and the resistor R2 are linearly disposed. The resistor R3 and the resistor R4 are linearly disposed. The resistors R1, R2 are mutually parallel to the resistors R3, R4. It should be noted that, though the resistors R1, R2, R3, R4 are linearly arranged in FIG. 1A, the resistors R1, R2, R3, R4 are not necessarily linearly arranged in the first exemplary embodiment.

Connecting portions 130 each connecting the resistor R1 and the resistor R2, the resistor R2 and the resistor R3, the resistor R3 and the resistor R4, and the resistor R4 and the resistor R1 are provided on the flat surface of the insulation film 12. The strain gauge 13 and the connecting portions 130 are formed during a common vapor deposition, sputtering or the like process on the flat surface of the insulation film 12. The strain gauge 13 and the connecting portions 130 are made from a semiconductor material or a metal material and have a thickness negligibly thin as compared with the thickness of the insulative resin layer 17.

The electrodes 14 and the bonding pads 15 are formed during the common vapor deposition, sputtering or the like process. The electrodes 14 are disposed to cover the connecting portions 130 extending from the strain gauge 13. The electrodes 14 and the bonding pads 15 are made from a conductive metal material such as gold, and have a thickness negligibly thin as compared with the thickness of the insulative resin layer 17.

The bonding pads 15 extend from the electrodes 14 and are exposed to an outside in order to export electric signals to the outside.

Each of the bonding pads 15 includes a bonding surface 15A on which each of the bonding wires 16 is bonded.

The insulative resin layer 17 is in a form of a belt so as to collectively cover the four resistors R1, R2, R3, R4 and a part of the electrodes 14 without covering the bonding pads 15 and the bonding wires 16.

The insulative resin layer 17 is made from silicone resin. An upper surface of the insulative resin layer 17 is parallel to the film-formation surface 10C as shown in FIG. 1B. It should be noted that the upper surface of the insulative resin layer 17 in the first exemplary embodiment is not necessarily flat but may be dented or projected.

A thickness t of the insulative resin layer 17 in the first exemplary embodiment is defined as a dimension between an upper surface of the protection film 18 and the upper surface of the insulative resin layer 17 and is in a range from 2 μm to 500 μm. When the thickness of the insulative resin layer 17 is less than 2 μm, the thickness of the insulative resin layer 17 is too thin to reduce the influence of the surface charge. When the thickness of the insulative resin layer 17 exceeds 500 μm, the thickness of the insulative resin layer 17 is so thick that the displacement of the strain gauge is inhibited, thereby deteriorating the strain detection accuracy.

Shore A hardness of the insulative resin layer 17 is in a range from 10 to 100. When the Shore A hardness is less than 10, the insulative resin layer 17 is too soft to maintain the shape of the insulative resin layer 17. When the Shore A hardness of the insulative resin layer 17 exceeds 100, the insulative resin layer 17 is so hard that the displacement of the strain gauge is inhibited, thereby deteriorating the strain detection accuracy.

The protection film 18 is made from silicon oxide film or silicon nitride film. The insulative resin layer 17 is disposed on the protection film 18.

Manufacturing Method of Strain Detector

Next, a manufacturing method of the strain detector 1 will be described below.

Initially, the pressure-sensitive element 10 is produced. The end faces of the cylindrical portion 10A and the strain-causing portion 10B of the pressure-sensitive element 10 define the film-formation surface 10C. The insulation film 12 is formed all over the film-formation surface 10C by vapor deposition or the like.

The strain gauge 13 and the connecting portions 130 are formed on the insulation film 12 by vapor deposition or the like and the electrodes 14 and the bonding pads 15 are subsequently formed by vapor deposition or the like.

The protection film 18 is formed on the insulation film 12, the strain gauge 13 and the electrodes 14. At this time, though the strain gauge 13 is covered with the protection film 18, the bonding pads 15 are not covered with the protection film 18.

Then, while the four bonding pads 15 are not covered but exposed, the insulative resin layer 17 is formed on a part of the electrodes 14 and the protection film 18. In order to form the insulative resin layer 17, silicone resin is coated using a suitable coater such as a nozzle (not shown).

It should be noted that a mask (not shown) may be disposed over the four bonding pads 15 so that the four bonding pads 15 are not covered with the insulative resin layer 17.

Then, the bonding wires 16 are bonded to the exposed bonding pads 15.

Advantage(s) of First Exemplary Embodiment (1) The strain detector 1 includes the strain-causing portion 10B, the insulation film 12 formed on the strain-causing portion 10B, the strain gauge 13 formed on the insulation film 12 and configured to detect the strain generated by the strain-causing portion 10B as electric signals, the electrodes 14 connected to the strain gauge 13, the bonding pads 15 each extending from each of the electrodes 14, the bonding wires 16 each connected to each of the bonding pads 15, and the insulative resin layer 17 covering the strain gauge 13 without covering the bonding pads 15 and the bonding wires 16. Since the strain gauge 13 is covered with the insulative resin layer 17, the change in the surface charge in the vicinity of the strain gauge 13 can be reduced, so that the strain measurement accuracy can be kept at a favorable level. Further, since the insulative resin layer 17 does not cover the bonding pads 15 and the bonding wires 16, the bonding wires 16 do not inhibit the formation of the insulative resin layer 17, so that the manufacturing process of the strain detector 1 can be simplified.

(2) Since the thickness t of the insulative resin layer 17 is set within an appropriate range of 2 μm to 500 μm the influence of the surface charge can be reduced and excellent strain detection accuracy can be obtained.

(3) Since the insulative resin layer 17 is made from silicone resin and has an appropriate range of the Shore A hardness ranging from 10 to 100, excellent strain detection accuracy can be obtained.

(4) Since the strain gauge 13 includes the four resistors R1, R2, R3, R4 and the insulative resin layer 17 collectively covers the four resistors R1, R2, R3, R4, the formation process of the insulative resin layer 17 can be facilitated by the consecutive coating of the silicone resin.

Second Exemplary Embodiment

Next, a second exemplary embodiment of the invention will be described below with reference to FIG. 2.

A strain detector 2 according to the second exemplary embodiment has the same arrangement as that in the first exemplary embodiment except that the insulative resin layer 17 has an arrangement different from that of the strain detector 1 in the first exemplary embodiment.

Figure 2:
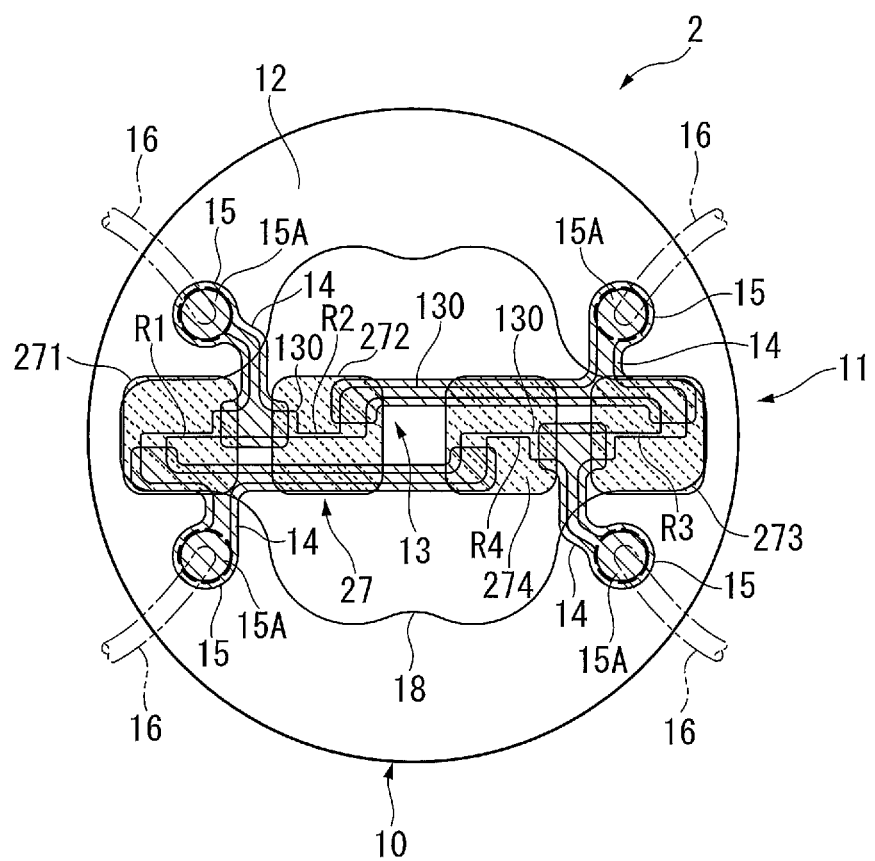
FIG. 2 is a plan view showing a strain detector according to a second exemplary embodiment of the invention.

FIG. 2 is a plan view of the strain detector according to the second exemplary embodiment.

As shown in FIG. 2, the strain detector 2 includes the detector 11. The detector 11 includes the insulation film 12, the strain gauge 13, the electrodes 14, the bonding pads 15, the bonding wires 16, the insulative resin layer 27 and the protection film 18. The insulative resin layer 27 is arranged to separately cover at least the four resistors R1, R2, R3, R4.

Specifically, the insulative resin layer 27 includes a first resin layer 271 covering the resistor R1 and a vicinity thereof, a second resin layer 272 covering the resistor R2 and a vicinity thereof, a fourth resin layer 274 covering the resistor R4 and a vicinity thereof and a third resin layer 273 covering the resistor R3 and a vicinity thereof.

Though the first resin layer 271, the second resin layer 272, the third resin layer 273 and the fourth resin layer 274 each have a rectangular shape in a plan view in FIG. 2, the first to fourth resin layers 271 to 274 may alternatively and each independently be a dot (i.e. a circle) or the like.

The manufacturing method of the strain detector 2 of the second exemplary embodiment is substantially the same as that in the first exemplary embodiment. The insulation film 12 is formed on the film-formation surface 10C of the pressure-sensitive element 10, the strain gauge 13 and the connecting portion 130 are formed on the insulation film 12, the electrodes 14 and the bonding pads 15 are formed, and the protection film 18 is formed on the insulation film 12, the strain gauge 13 and the electrodes 14.

Then, the insulative resin layer 27 is formed on a part of the electrodes 14 and on the protection film 18. At this time, when a coater in a form of a nozzle is used, silicone resin is coated at predetermined positions.

In the second exemplary embodiment, the following advantage can be obtained in addition to the advantages (1) to (3) in the first exemplary embodiment.

(5) Since the insulative resin layer 27 includes the first resin layer 271 covering the resistor R1, the second resin layer 272 covering the resistor R2, the third resin layer 273 covering the resistor R3 and the fourth resin layer 274 covering the resistor R4, the amount of the silicone resin used for forming the insulative resin layer 27 at necessary portions can be reduced, so that the production cost can be reduced.

Third Exemplary Embodiment

Next, a third exemplary embodiment of the invention will be described below with reference to FIGS. 3 and 4.

In the third exemplary embodiment, the strain detector 1 of the first exemplary embodiment is installed in a sensor module 4.

Figure 3:
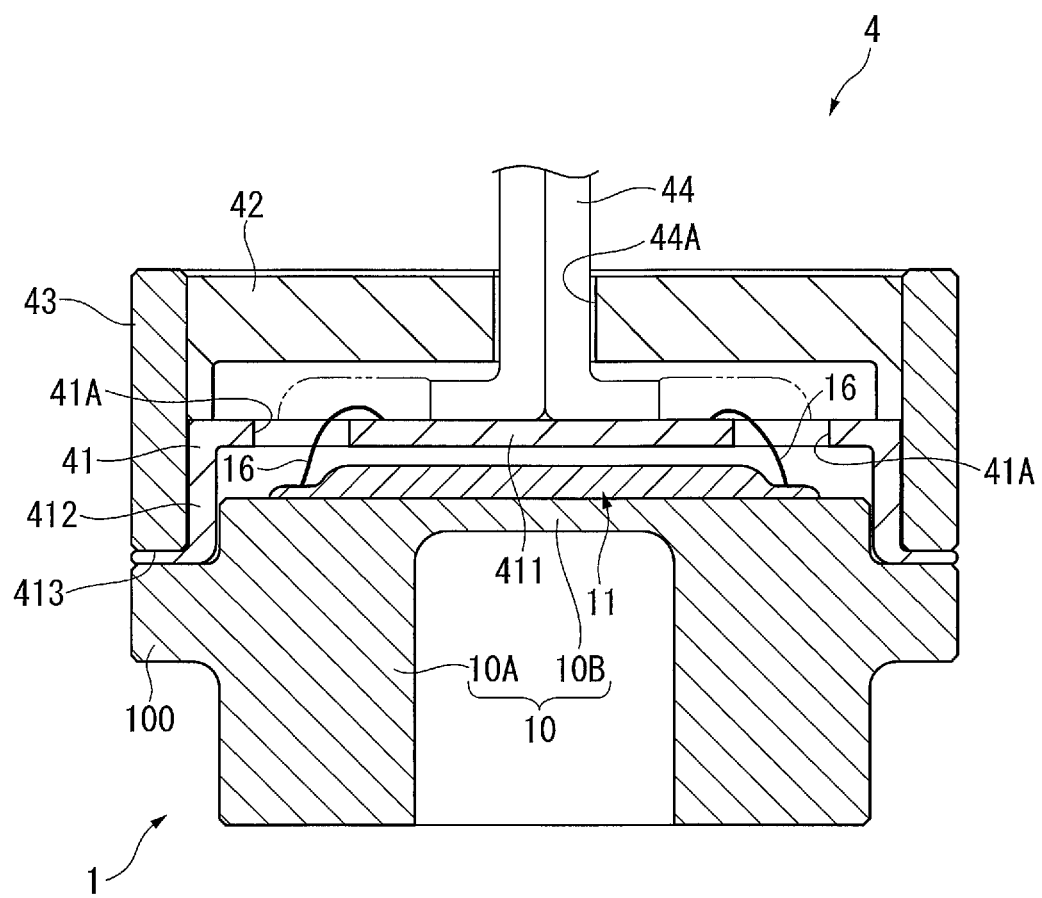
FIG. 3 is a cross section showing a sensor module according to a third exemplary embodiment of the invention.

FIG. 3 shows an entire arrangement of the sensor module 4.

As shown in FIG. 3, the sensor module 4 includes: a strain detector 1; an intermediate terminal base 41 engaged with the flange 100 of the strain detector 1; a resin cover 42 provided on the intermediate terminal base 41; an outer cylinder 43 provided on outer circumferential surfaces of the intermediate terminal base 41 and the resin cover 42; and an electrical wire 44 connected to the strain detector 1.

The intermediate terminal base 41 includes a disk portion 411, a cylindrical portion 412 provided on a periphery of the disk portion 411 and a flange portion 413 provided at an opening end of the cylindrical portion 412. An inner circumferential portion of the cylindrical portion 412 is fitted to an outer circumferential portion of the cylindrical portion 10A of the pressure-sensitive element 10. The flange portion 413 is held between the flange 100 and the outer cylinder 43.

The resin cover 42 is a cap-shaped component covering the intermediate terminal base 41. An insertion hole 44A configured to receive the electrical wire 44 is formed at the center of the resin cover 42.

An end of the electrical wire 44 is connected to a conductive portion (not shown) of the disk portion 411. The conductive portion is connected to the bonding wires 16. Accordingly, the signal detected by the detector 11 is outputted to the outside through the bonding wires 16, the conductive portion and the electrical wire 44.

Figure 4:
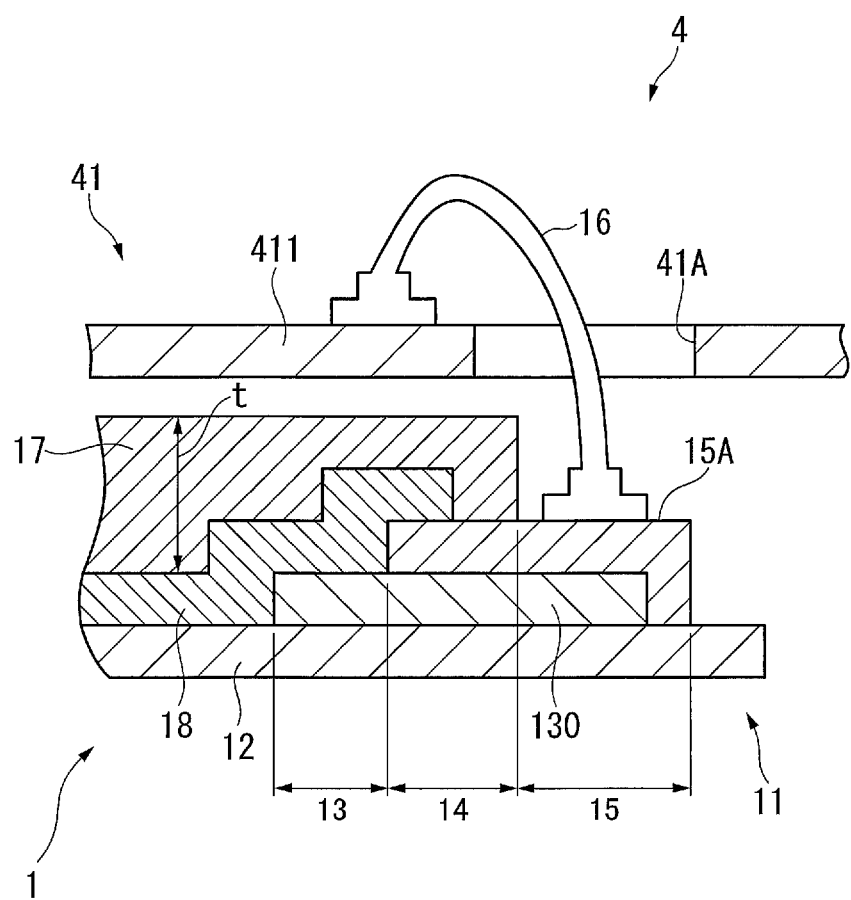
FIG. 4 is an enlarged cross section showing a relevant part in FIG. 3.

FIG. 4 shows a relevant part in FIG. 3 in an enlarged manner. As shown in FIG. 4, each of the bonding wire 16 is inserted into the insertion hole 41A formed in the disk portion 411.

Accordingly, the third exemplary embodiment can offer the same advantages as those in the first exemplary embodiment.

Modification(s)

Incidentally, it should be understood that the scope of the present invention is not limited to the above-described exemplary embodiment(s) but includes modifications and improvements as long as the modifications and improvements are compatible with the invention.

For instance, though the insulative resin layer 17 is formed on a part of the electrodes 14 and on the protection film 18 in each of the above-described embodiments, the protection film 18 may be omitted in the invention.

Figure 5A:
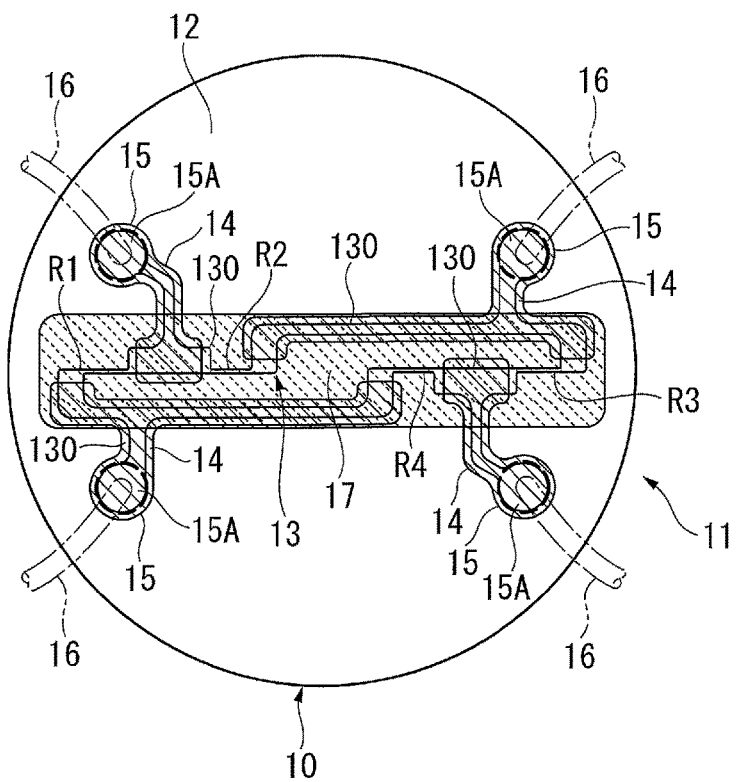
FIG. 5A is a plan view showing a strain detector according to a modification of the invention.
Figure 5B:
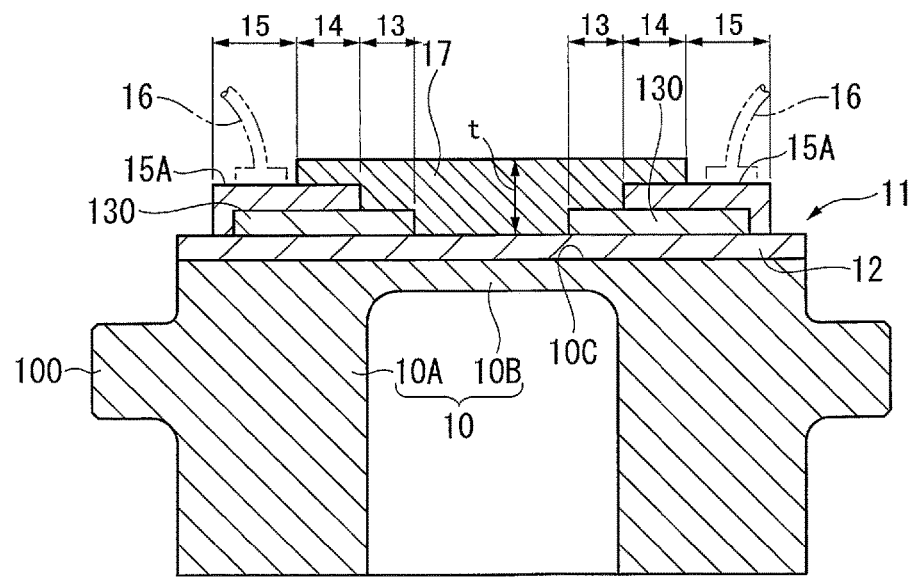
FIG. 5B is a cross section showing the strain detector according to the modification of the invention.

Specifically, as shown in FIGS. 5A and 5B, the insulation film 12, a part of the strain gauge 13 and a part of the electrodes 14 may be directly covered with the insulative resin layer 17. In this arrangement, the thickness of the insulative resin layer 17 is defined as a distance between the upper surface of the insulation film 12 and the upper surface of the insulative resin layer 17.

In order to manufacture the strain detector shown in FIGS. 5A and 5B, the strain gauge 13 and the connecting portion 130 are formed on the insulation film 12, the electrodes 14 and the bonding pads 15 are subsequently formed, and, while the four bonding pads 15 are uncovered and exposed, the insulative resin layer 17 is formed on a part of the electrodes 14 and on the strain gauge 13.

Though the resistor R1 and the resistor R2 are linearly disposed and the resistor R3 and the resistor R4 are linearly disposed among the four resistors R1, R2, R3, R4 of the strain gauge 13 in each of the exemplary embodiments, the four resistors of the invention may be arranged in a different manner.

Further, though the insulation film 12 is formed all over (i.e. on the entire surface of) the film-formation surface 10C in the exemplary embodiments, the insulation film 12 may be formed only on a part of the film-formation surface 10C.

What is claimed is:

1. A strain detector comprising:
    a strain-causing portion configured to cause a strain in response to an external stress;
    an insulation film formed on at least a part of the strain-causing portion;
    a strain gauge formed on the insulation film, the strain gauge being configured to detect the strain caused by the strain-causing portion as an electric signal;
    an electrode connected to the strain gauge;
    a bonding pad extended from the electrode and configured to export the electric signal to an outside;
    a bonding wire connected to the bonding pad; and
    an insulative resin layer at least covering the strain gauge without covering the bonding pad and the bonding wire,
    wherein a thickness of the insulative resin layer is between about 2 μm to 500 μm.

2. The strain detector according to claim 1, wherein the insulative resin layer is formed from a silicone resin and has a Shore A hardness ranging from 10 to 100.

3. The strain detector according to claim 1, wherein the strain gauge includes four resistors, the insulative resin layer collectively covering the four resistors.

4. The strain detector according to claim 1, wherein the strain gauge includes four resistors, the insulative resin layer separately covering each of the four resistors.

5. The strain detector according to claim 1, further comprising a protection film disposed on the strain gauge and the electrode, the protection film being covered with the insulative resin layer.

6. A method for producing a strain detector comprising: a strain-causing portion configured to cause a strain in response to an external stress; an insulation film formed on at least a part of the strain-causing portion; a strain gauge formed on the insulation film, the strain gauge being configured to detect the strain caused by the strain-causing portion as an electric signal; an electrode connected to the strain gauge; a bonding pad extended from the electrode and configured to export the electric signal to an outside; and a bonding wire connected to the bonding pad, the method comprising:
    prior to connecting the bonding wire to the bonding pad, covering at least the strain gauge using an insulative resin layer without covering the bonding pad, wherein a thickness of the insulative resin layer is between about 2 μm to 500 μm.

7. The method according to claim 6, wherein the strain detector further comprises a protection film disposed on the strain gauge and the electrode, the protection film being covered with the insulative resin layer.

* * * * *